April 14, 1931.    M. ZAIGER ET AL    1,800,274
SPLASH FLAP FOR AUTOMOBILES
Filed Oct. 19, 1929
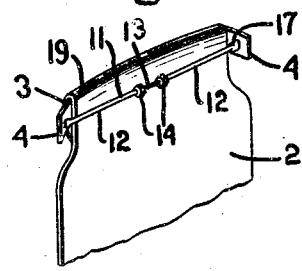
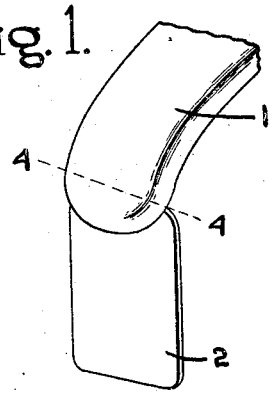
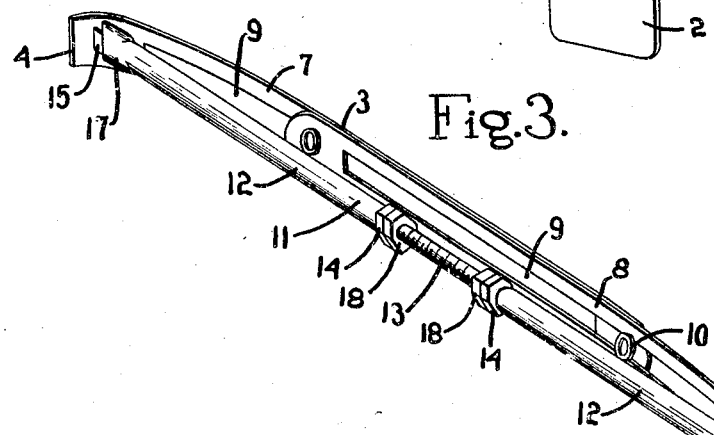
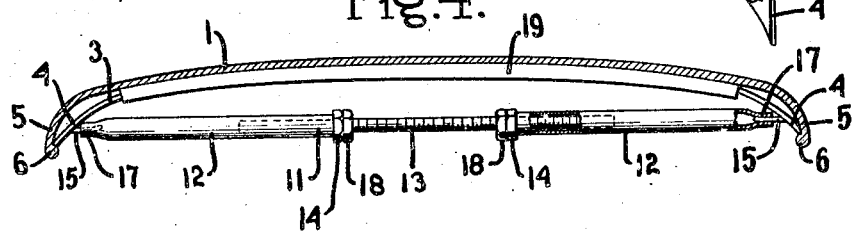
Inventors.
Max Zaiger
Louis Zaiger
by Heard Smith & Tennant.
Attys.

Patented Apr. 14, 1931

1,800,274

UNITED STATES PATENT OFFICE

MAX ZAIGER AND LOUIS ZAIGER, OF LYNN, MASSACHUSETTS

SPLASH FLAP FOR AUTOMOBILES

Application filed October 19, 1929. Serial No. 400,774.

This invention relates to a splash flap for automobiles, that is, a flap adapted to be attached to the rear fender to prevent the rear wheel from throwing mud, tar, etc. onto the rear fender and bumper.

The object of the invention is to provide a novel holder device for the flap which will securely hold it to the fender but which is so constructed that no portion of the holding device will be visible on the exterior of the fender.

In order to give an understanding of the invention we have illustrated in the drawings a selected embodiment thereof which will now be described after which the novel features will be pointed out in the appended claims.

Fig. 1 of the drawings is a perspective view of the rear fender of the automobile with a flap attached thereto;

Fig. 2 is a perspective view of the flap and holder attached;

Fig. 3 is a perspective view of the holder by itself;

Fig. 4 is an enlarged section on the line 4—4, Fig. 1.

In the drawings 1 indicates the rear fender of an automobile and 2 is the splash flap or splash-intercepting curtain which is secured thereto. The present invention relates particularly to the means for attaching the flap to the fender and as stated above one of the objects of the invention is to provide a novel holder or attaching means which will securely retain the flap in place while at the same time being entirely concealed beneath the fender.

The flap-attaching means comprises an extensible bar or flap-suspending member 3 on which the flap 2 is hung and which is adapted to be placed on the inside of the fender 1, and an extensible strut member or clamping member, indicated generally at 11, and which engages the flap-suspending member 3 adjacent its ends 4 in sub-tending relation thereto and serves to hold said flap-suspending member 3 firmly clamped to the flanges 5 of the fender 1.

In the construction herein shown the extremities of the flap-suspending member 3 rest against the usual beads 6 with which the flanges 5 of the fender are provided at their edges and the extensible strut member or expansion member 11 forces the ends of the clamping member firmly against said beads thereby clamping the flap-supporting member in place.

The flap-suspending member 3 may be made in various ways without departing from the invention. One convenient construction is to form it of two strips of metal indicated at 7 and 8 which are adapted to slide one on the other thereby to expand or contract the bar longitudinally.

The flap 2 is provided with a pocket at its upper end extending from one edge to the other through which the flap-suspending member 3 extends.

As herein shown each section 7 and 8 is provided with a slot 9 and each also has at its end a headed stud 10 which projects through the slot of the other member, the head of the stud overlying the face of the other member, whereby each member is confined between the other member and the head of the stud carried thereby.

The strut member or clamping member is indicated generally at 11. It is extensible and is arranged to engage the flap-suspending or holder member 3 at its ends thereby to clamp the ends of the holding member 3 firmly against the edges of the fender. As herein illustrated the clamping member or strut member is formed with two tubular sections 12 between which is a screw-threaded section 13 having its ends entering the tubular sections, the sections 13 being provided with adjusting nuts 14 by which the tubular sections may be forced apart.

The flap-supporting member 3 is provided at each end with an ear or lug 15 and the outer ends of the tubular sections 12 fit over said ears or lugs. These outer ends may conveniently be flattened slightly as shown at 17 although this is not essential.

18 indicates lock nuts which are screw threaded on the section 13 and which serve to lock the adjusting nuts in adjusted position.

The flap 2 is provided at its upper end with a loop portion 19 through which the flap-supporting member 3 extends, the ends of the latter projecting beyond the sides of the flap. The strut member 11 is located on the inside of the flap 2 and is thus accessible to be manipulated.

In applying the device to an automobile the flap-supporting member 3 will first be inserted through the loop 19 of the flap and then the strut member 11 assembled therewith by inserting the ends 17 of the tubular sections 12 over the lugs 15. The member 3 is then placed beneath the fender of the car and extended until the ends 4 engage the side flanges 5 of the fender inside the beads 6 as shown in Fig. 4.

The nuts 14 may then be screwed up to force the tubular sections 12 apart thereby clamping the ends 4 of the flap supporting member 3 against the sides of the fender with sufficient pressure to firmly retain it in position. The member 3 is preferably made somewhat flexible so that it will readily conform to fenders of different shape although this is not an essential feature of the invention. It will be noted that the clamping member 11 has engagement with the flap-supporting member 3 at points adjacent to but separated from the extremities thereof and that the ends of the clamping member have an angular relation to the portions of the flap-supporting member which they engage. Where the flap-supporting member is of flexible material, as above described, the clamping pressure which the clamping member applies to said flap-supporting member tends to cause it to flex or to bow outwardly thus holding the flap in flexed conformity with the interior of the fender.

It will be noted that all of the parts of the flap-attaching means are located underneath the fender so that nothing is visible outside the fender. This is an advantage because it avoids any unsightliness due to having any part of the clamping portion of said means visible on the outside of the fender. Another advantage of the invention is that the parts which require adjustment for attaching the flap-supporting member to the fender or detaching it therefrom are exposed on the outside of the fender and are, therefore, easily accessible.

While we have illustrated herein a selected embodiment of the invention we do not wish to be limited to the constructional features shown.

We claim:

1. A splash flap for the rear fender of an automobile comprising an extensible flap-supporting member having ends adapted to engage the inside of the edge flanges of the rear fender, a flap hung from the flap-supporting member and an extensible clamping member exterior to the flap and having engagement with the flap-supporting member adjacent its ends for clamping said ends against the fender.

2. A splash flap for the rear fender of an automobile comprising an extensible flap-supporting member having ends adapted to engage the inside of the edge flanges of the rear fender, said member having a lug at each end, an extensible clamping member having its ends engaging said lugs, and adapted to clamp the ends of the member firmly against the inside of the fender flanges, and a splash flap hung from said flap-supporting member.

3. A splash flap for the rear fender of an automobile comprising an extensible flap-supporting member having its ends adapted to engage the inside of the edge flanges of the rear fender, said member having an inwardly-projecting lug at each end, a clamping member comprising two tubular sections with their ends fitting over said lugs, and means for forcing said sections outwardly thereby to clamp the ends of the flap-supporting member firmly against the side flanges of the rear fender, and a splash flap hung from said flap-supporting member.

4. A splash flap for the rear fender of an automobile comprising an extensible, flap-supporting member having its ends adapted to engage the inside of the edge flanges of the rear fender, an extensible clamping member engaging the member near its ends, said clamping member comprising two tubular sections, a screw-thread section between the tubular sections and having telescopic engagement therewith and clamping nuts on the screw-threaded section for spreading the tubular sections, spreading movement of the tubular sections clamping the ends of the flap-supporting member firmly against the inside of the rear fender, and a splash flap hung from said flap-supporting member.

5. In a fender guard, a splash intercepting curtain, a pair of relatively adjustable suspending members therefor, adjustable means engaging opposite ends of said suspending means to expand the suspending member within the fender and hold said curtain within and against said fender.

6. A splash flap structure for vehicles having a fender with edge flanges, comprising a flap-supporting member adapted to extend between and to engage the inner sides of said flanges, a splash flap supported on said member, and means situated entirely outside of the splash flap and extending from one end to the other of the flap-supporting member in subtending relation thereto, and in engagement therewith and by which said member is caused to forcibly engage the flanges of the fender.

7. A splash flap structure for vehicles having a fender with edge flanges comprising a flexible flap-supporting member adapted to extend between said flanges with its ends bearing against them, a splash flap supported on said flap-supporting member, and an extensible clamping member situated exterior of the flap and engaging the flap-supporting member adjacent its ends, whereby when the clamping member is extended said ends of the flap-supporting member are clamped against the flanges of the fender and the clamping pressure holds the flap-supporting member in flexed conformity with the interior of the fender.

8. A splash flap construction for the fender of an automobile comprising a splash flap, a pair of flexible strips extending transversely of said flap and from which said flap is suspended, and an expansion member engaging said strips in subtending relation thereto and holding them in flexed conformity with the interior of the fender.

In testimony whereof, we have signed our names to this specification.

MAX ZAIGER.
LOUIS ZAIGER.

CERTIFICATE OF CORRECTION.

Patent No. 1,800,274.　　　　　　　　　　　　　　　Granted April 14, 1931, to

MAX ZAIGER ET AL.

It is hereby certified that error appears in the printed specification of the above numbered patent requiring correction as follows: Page 2, line 75, claim 2, before the word "member" insert the words flap-supporting; and that the said Letters Patent should be read with this correction therein that the same may conform to the record of the case in the Patent Office.

Signed and sealed this 2nd day of June, A. D. 1931.

(Seal)

M. J. Moore,
Acting Commissioner of Patents.